United States Patent
Inaba et al.

(10) Patent No.: US 9,093,099 B2
(45) Date of Patent: Jul. 28, 2015

(54) PERPENDICULAR MAGNETIC RECORDING MEDIUM AND METHOD FOR MANUFACTURING THE SAME

(71) Applicant: FUJI ELECTRIC CO., LTD., Kawasaki-shi, Kanagawa (JP)

(72) Inventors: Yuki Inaba, Matsumoto (JP); Takehito Shimatsu, Sendai (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 2 days.

(21) Appl. No.: 13/936,798

(22) Filed: Jul. 8, 2013

(65) Prior Publication Data

US 2014/0072828 A1    Mar. 13, 2014

(30) Foreign Application Priority Data

Sep. 11, 2012  (JP) .................................. 2012-199606

(51) Int. Cl.
  *G11B 5/66*  (2006.01)
  *G11B 5/64*  (2006.01)
  (Continued)

(52) U.S. Cl.
  CPC ................. *G11B 5/645* (2013.01); *G11B 5/732* (2013.01); *G11B 5/7325* (2013.01); *G11B 5/84* (2013.01); *G11B 5/8404* (2013.01)

(58) Field of Classification Search
  CPC .............................. G11B 5/732; G11B 5/7325
  USPC .............................. 204/192.2; 428/831, 831.2
  See application file for complete search history.

(56) References Cited

U.S. PATENT DOCUMENTS 6,641,934 B1 * 11/2003 Suzuki et al. ................. 428/828
6,709,775 B1 *  3/2004 Takahashi et al. ......... 428/831.2
(Continued)

FOREIGN PATENT DOCUMENTS

JP    A-2001-101645    4/2001
JP    A-2001-189010    7/2001
(Continued)

OTHER PUBLICATIONS

Maeda, Tomoyuki, "Fabrication of Highly (001) Oriented $L1_0$ FePt Thin Film Using NiTa Seed Layer," *IEEE Transactions on Magnetics*, vol. 41, No. 10, pp. 3331-3333, Oct. 2005.
(Continued)

*Primary Examiner* — Holly Rickman
(74) *Attorney, Agent, or Firm* — Oliff PLC (57) ABSTRACT

Provided are a perpendicular magnetic recording medium and a method for manufacturing the same, the perpendicular magnetic recording medium including an alloy (FePt, FePd, or CoPt) having a large $K_u$ value with an $L1_0$ type ordered structure, and obtained with achievement of controlled crystal orientation and thin film formation without heating. Specifically, in the perpendicular magnetic recording medium, at least a nonmagnetic seed layer, a nonmagnetic underlayer, and a magnetic layer are formed in this order on a nonmagnetic substrate. The nonmagnetic seed layer includes a MgO layer and a metal layer having a body-centered cubic (bcc) structure. The nonmagnetic underlayer has a NaCl type structure of one selected from the group consisting of MgO, NiO, TiO, CrN, Ti carbides, and Ti nitrides. The magnetic layer includes an alloy selected from the group consisting of FePt, FePd, and CoPt having an $L1_0$ type ordered structure.

6 Claims, 9 Drawing Sheets

(51) Int. Cl.
*G11B 5/73* (2006.01)
*G11B 5/84* (2006.01)

(56) References Cited

U.S. PATENT DOCUMENTS

| | | | | |
|---|---|---|---|---|
| 6,846,583 | B2 * | 1/2005 | Inaba et al. | 428/831 |
| 6,863,998 | B2 * | 3/2005 | Koda et al. | 428/832.2 |
| 2012/0113768 | A1 * | 5/2012 | Kanbe et al. | 369/13.24 |

FOREIGN PATENT DOCUMENTS

| | | |
|---|---|---|
| JP | A-2002-208129 | 7/2002 |
| JP | A-2002-216330 | 8/2002 |
| JP | A-2003-173511 | 6/2003 |
| JP | B2-3434476 | 8/2003 |
| JP | A-2004-311607 | 11/2004 |
| JP | B2-3730518 | 1/2006 |
| JP | B2-3730906 | 1/2006 |
| JP | B2-4091228 | 5/2008 |
| JP | B2-4199194 | 12/2008 |
| JP | A-2010-034182 | 2/2010 |
| JP | A-2010-135610 | 6/2010 |
| WO | WO 2004/034385 A1 | 4/2004 |

OTHER PUBLICATIONS

Suzuki et al., "Preparation of ordered Fe-Pt thin films for perpendicular magnetic recording media," *Journal of Magnetism and Magnetic Materials*, vol. 193, pp. 85-88, 1999.

Lee et al., "MgO seed layers for CoCrPt/Cr longitudinal magnetic recording media," *Applied Physics Letters*, vol. 67, No. 24, pp. 3638-3640, Dec. 11, 1995.

Gauthier et al., "Surface-sandwich segregation on nondilute bimetallic alloys: $Pt_{50}Ni_{50}$ and $Pt_{78}Ni_{22}$ probed by low-energy electron diffraction," *Physical Review B*, vol. 31, No. 10, pp. 6216-6218, May 15, 1985.

Gauthier et al., "Influence of the transition metal and of order on the composition profile of $Pt_{80}M_{20}(111)$ (M=Ni, Co, Fe) alloy surfaces: Leed study of $Pt_{80}Co_{20}(111)$," *Surface Science*, vol. 276, pp. 1-11, 1992.

Lee et al., "Second nearest-neighbor modified embedded atom method potentials for bcc transition metals," *Physical Review B*, vol. 64, pp. 184102-1-184102-11, 2001.

* cited by examiner

PERPENDICULAR MAGNETIC RECORDING MEDIUM AND METHOD FOR MANUFACTURING THE SAME

CROSS-REFERENCE TO RELATED APPLICATIONS

This application claims the benefit of Japanese Patent Application No. 2012-199606, filed Sep. 11, 2012, which is hereby incorporated by reference herein in its entirety.

BACKGROUND OF THE INVENTION

1. Field of the Invention

The present invention relates to a perpendicular magnetic recording medium and a method for manufacturing the same. The present invention relates to a perpendicular magnetic recording medium preferably mounted on various magnetic recording devices such external recording devices for a computer, and to a method for manufacturing the perpendicular magnetic recording medium.

2. Description of the Related Art

A recording method for a magnetic recording medium used in a magnetic recording device, such as a hard disk, a magneto optical drive (MO) disk, or a magnetic tape, includes two types of longitudinal magnetic recording and perpendicular magnetic recording. As a recording method used for the hard disk, the longitudinal magnetic recording has been employed for many years, in which magnetic patterns horizontal to the disk surface are recorded. However, an increase in recording density has made noticeable a problem of thermal fluctuations, that is, a problem of disappearing recorded magnetization due to thermal energy. Additionally, with the increase in recording density, the longitudinal magnetic recording also has caused a problem of having unstability in a site where the same poles of magnetizations face each other. Thus, since around the year 2005, the perpendicular magnetic recording enabling a higher recording density has been used in which magnetic patterns perpendicular to the disk surface are recorded. Recently, almost all magnetic recording media used are perpendicular magnetic recording media.

Heretofore, studies on metallic magnetic materials for perpendicular magnetic recording media have been concentrated on magnetic layers made of CoCr-based non-ordered alloys including CoCrPt. Nevertheless, in consideration of anticipation of perpendicular magnetic recording media also having a thermal fluctuation problem in the future as fineness of recorded magnetic patterns increases, the material needs to have a larger perpendicular magnetic anisotropy than conventional CoCr-based materials. As a leading candidate, ordered alloy-based materials have been actively studied. Such ordered alloy-based materials have an ordered phase formed of, for example, at least one magnetic element selected from Fe, Co, and Ni, and at least one noble metal element selected from Pt, Pd, Au, and Ir. Particularly, FePt and CoPt, ordered alloys having a fct crystal structure, are known to have a magnetic anisotropy as large as $7 \times 10^7$ erg/cm$^3$ and $4 \times 10^7$ erg/cm$^3$, respectively, in a c-axis direction that is an easy axis of magnetization. The magnetic anisotropy of these is twice or, more of values obtained by CoCr-based materials currently. Patent Literatures 1 to 6 noted below describe $L1_0$ type ordered alloys such as the FePt and CoPt ordered alloys and a FePd ordered alloy, as well as magnetic recording media using such alloys as a magnetic layer.

Researches are in progress to apply a polycrystalline thin film having a large magnetic anisotropy in a c-axis (easy axis of magnetization) direction as described above to a longitudinal or perpendicular magnetic recording medium.

CITATION LIST

Patent Literature

Patent Literature 1: Japanese Patent Laid-Open No. 2002-208129
Patent Literature 2: Japanese Patent No. 3730906
Patent Literature 3: Japanese Patent No. 3730518
Patent Literature 4: Japanese Patent Laid-Open No. 2004-311607
Patent Literature 5: Japanese Patent No. 3434476
Patent Literature 6: Japanese Patent No. 4199194
Patent Literature 7: Japanese Patent No. 4091228
Patent Literature 8: Japanese Patent Laid-Open No. 2010-34182
Patent Literature 9: Japanese Patent Laid-Open No. 2010-135610
Patent Literature 10: Japanese Patent Laid-Open No. 2003-173511

Non Patent Literature

Non-Patent Literature 1: T. Maeda, IEEE Trans. Magn., vol. 41, pp. 3331-3333 (2005)
Non-Patent Literature 2: T. Suzuki, et al., J. Magn. Magn. Mater., vol. 193, pp. 85-88 (1999)
Non-Patent Literature 3: Li-Lien Lee, et al., Appl. Phys. Lett., vol. 67, pp. 3638-3640 (1995)
Non-Patent Literature 4: Y. Gauthier, et al., Phys. Rev. B, vol. 31, pp. 6216-6218 (1985)
Non-Patent Literature 5: Y. Gauthier, et al., Surf. Sci., vol. 276, pp. 1-11 (1992)
Non-Patent Literature 6: Byeong-Joo Lee, at al., Phys. Rev. B, vol. 64, p. 184102 (2001)

In order to manufacture perpendicular magnetic recording media having a large anisotropic energy ($K_u$) value using an ordered alloy, the following two problems have to be overcome.

The first problem is to control an orientation of an easy axis of magnetization. In not only ordered alloys but also in all longitudinal magnetic recording media, magnetic materials used for a magnetic recording layer have easy axises of magnetization in an in-plane direction, whereas a perpendicular magnetic recording medium has an easy axis of magnetization in a perpendicular direction. In order to orient the easy axis of magnetization in a desired direction, each crystal grain needs to be oriented while growing. In the case of using sputtering, which is an ordinary process for forming a magnetic recording layer, one of the most potent methods for controlling the orientation of a magnetic recording layer is to stack a magnetic thin film on an underlayer having certain crystallinity. In addition to this, annealing may also be performed after and/or while the magnetic thin film is formed.

For example, Non-Patent Literature 1 discloses Pt (20 nm)/Cr (5 nm)/NiTa (25 nm) as underlayers of FePt having an $L1_0$ structure. Note that, the left side of "/" in the description of a laminated film represents an upper layer, while the right side represents a lower layer. Moreover, Patent Literature 7 discloses an oxide, a nitride, or a carbide, which have a NaCl structure. Further, Non-Patent Literature 2 discloses Cr (7 nm)/MgO (10 nm) as underlayers. In any of these, the layer immediately below FePt grows to have a (002) plane parallel to the substrate surface, and the second layer is provided immediately below the underlayer to improve the orientation of the underlayer. In normal thin film growth processes, a thin film thus grown and formed has a plane where a surface energy of the material is minimum (normally, close-packed plane), the plane being parallel to the film surface. However, in the underlayers described above, planes other than the close-packed plane are oriented parallel to the film surface. For this reason, the substrate is heated during the thin film formation to apply thermal energy to atoms, so that a difference in energy from the close-packed plane having minimum surface energy can be reduced. In this manner, the orientation of the crystal surface is controlled.

All of the methods for forming an underlayer aimed at an $L1_0$ type ordered alloy exemplified above require heating when forming the underlayer. In consideration of mass production, a method is needed for forming an underlayer having a (001) plane oriented without heating. In this respect, Non-Patent Literature 3 discloses Cr used as an underlayer for CoCrPt longitudinal medium without heating, and Cr (100 nm)/MgO as layers for orientating the Cr (001) plane. In this literature, for the orientation of the Cr (001) plane, the MgO film thickness must be 5 nm or larger and the Cr film thickness must be 100 nm. Nevertheless, using thick films is not desirable in consideration of mass production. In consideration of mass production of magnetic recording media, it has been demanded to form a nonmagnetic underlayer and a nonmagnetic seed layer into thin films and to form highly oriented (001) plane without heating the substrate.

The second problem is to decrease an ordering temperature. To orderly arrange FePt, normally heating at around 700° C. is required. However, for the high-temperature heating, a substrate to be used for a medium needs to have a high thermal durability. Furthermore, the apparatus itself for manufacturing the medium also needs to have a high thermal durability. However, the substrate and the apparatus having an enough thermal durability to the high-temperature heating of 700° C. are not realistic. Accordingly, attempts to decrease the ordering temperature have been made for mass production of ordered alloys such as FePt. Non-Patent Literatures 3 to 5 disclose a method for decreasing an ordering temperature by adding Cu, Ag, or Au as a third element to a FePt alloy. All of the additive materials can effectively decrease the ordering temperature, but concurrently decreases the $K_u$ value. This brings about a problem that the merit of decreasing an ordering temperature cannot be enjoyed. Hence, a method for decreasing an ordering temperature without decreasing the $K_u$ value has been sought.

Regarding the problem, Patent Literatures 8, 9 disclose methods for forming a metastable $L1_1$ type $Co_{50}Pt_{50}$ alloy and $Co_{50}Pt_{50}$—C by adding C to the $Co_{50}Pt_{50}$ alloy at a substrate temperature of 350° C. through sputtering using a high-purity gas having an impurity concentration of 2 to 3 ppb. Non-Patent Literatures 4, 5 have revealed that any of FePt, CoPt, and NiPt produces the effect of precipitating Pt on the top layer in the thin film growth process. Patent Literatures 8, 9 describe low-temperature formation of metastable $L1_1$ type CoPt, wherein the purity of a process gas and the vacuum degree before film formation are keys for the $L1_1$ metastable phase formation. By using a gas having a low impurity concentration and increasing the vacuum degree, the effect of precipitating Pt on the top layer along with the growth of the film is strongly demonstrated, and presumably results in achievement of low-temperature formation of a structure in which monoatomic layers of Co and Pt are stacked in the film surface growth direction. At present, no example of demonstrating this effect in an $L1_0$ type ordered alloy is found. Meanwhile, in order to orient the easy axis of magnetization in the perpendicular direction, $L1_1$ type CoPt needs to have an fcc (111) plane oriented, whereas $L1_0$ type ordered alloys need to have a (002) plane oriented. Accordingly, if the manufacturing method for $L1_1$ type is directly applied to $L1_0$ type ordered alloys, the easy axis of magnetization cannot be oriented in the perpendicular direction, and a perpendicular magnetic recording medium cannot be formed. Thus, it has been sought to find the possibility of low-temperature formation of $L1_0$ type ordered alloys using a high-purity gas under an appropriate orientation control and to apply the formation method to perpendicular media.

SUMMARY OF THE INVENTION

The present invention has been made in view of the above-described problems. An object of the present invention is to provide a perpendicular magnetic recording medium and a method for manufacturing the same, the perpendicular magnetic recording medium including an alloy (FePt, FePd, or CoPt) having an $L1_0$ type ordered structure with a large $K_u$ value, and achieving controlled crystal orientation and thin film formation without heating. Meanwhile, another object of the present invention is to provide: a perpendicular magnetic recording medium, which achieves controlled crystal orientation of a nonmagnetic underlayer and a nonmagnetic seed layer as well as thin film formation without heating, and which has an ordering temperature decreased to 350° C. or lower by enhancing an effect of precipitating Pt on a top layer, the decreased ordering temperature being required for an L10 type ordered alloy (FePt, FePd, or CoPt) to have a large Ku value; and a method for manufacturing the perpendicular magnetic recording medium.

In order to achieve the above objects, the perpendicular magnetic recording medium of the present invention is a perpendicular magnetic recording medium including at least a nonmagnetic seed layer, a nonmagnetic underlayer, and a magnetic layer formed in this order on a nonmagnetic substrate. The nonmagnetic seed layer includes a MgO layer and a metal layer having a body-centered cubic (bcc) structure. The nonmagnetic underlayer has a NaCl type structure of one selected from the group consisting of MgO, NiO, TiO, CrN, Ti carbides, and Ti nitrides. The magnetic layer includes an alloy selected from the group consisting of FePt, FePd, and CoPt having an $L1_0$ type ordered structure.

Here, all of a (001) crystal lattice plane of the metal layer, a (001) crystal lattice plane of the NaCl type structure in the nonmagnetic underlayer, and a (001) crystal lattice plane of the $L1_0$ type ordered structure in the magnetic layer are preferably parallel to a film surface.

Moreover, a surface energy difference between a (002) plane and a (110) plane of the metal layer is preferably 300 erg/cm² or smaller. Further, the metal layer preferably has a thickness of 3 nm to 50 nm both inclusive, and the MgO layer disposed under the metal layer preferably has a thickness equal to or larger than one atomic layer (0.2 nm) but not larger than 3 nm.

Meanwhile, the method for manufacturing a perpendicular magnetic recording medium of the present invention includes a step of forming at least a nonmagnetic seed layer, a nonmagnetic underlayer, and a magnetic layer in this order on a nonmagnetic substrate. The nonmagnetic seed layer includes a MgO layer and a metal layer having a body-centered cubic (bcc) structure. The nonmagnetic underlayer has a NaCl type structure of one selected from the group consisting of MgO, NiO, TiO, CrN, Ti carbides, and Ti nitrides. The magnetic layer includes an alloy selected from the group consisting of FePt, FePd, and CoPt having an $L1_0$ type ordered structure. In the formation of the magnetic layer, the nonmagnetic substrate has a substrate temperature of 200° C. to 350° C., and a process gas has an impurity concentration of 5 ppb or lower.

The present invention makes it possible to provide a perpendicular magnetic recording medium and a method for manufacturing the same, the medium achieving controlled crystal orientation and thin film formation. For example, an ultra-high vacuum process achieves controlled crystal orientation of a nonmagnetic underlayer and a nonmagnetic seed layer as well as decreasing the layers thickness without heating. Moreover, it is possible to provide: a perpendicular magnetic recording medium, which has an ordering temperature decreased to, for example, 350° C. or lower by enhancing an effect of precipitating Pt or the like on a top layer, wherein the ordering temperature being required for an $L1_0$ type ordered alloy (FePt, FePd, or CoPt) to have a large $K_u$ value; and a method for manufacturing the perpendicular magnetic recording medium.

Further features of the present invention will become apparent from the following description of exemplary embodiments (with reference to the attached drawings).

DESCRIPTION OF THE EMBODIMENTS

Figure 1:
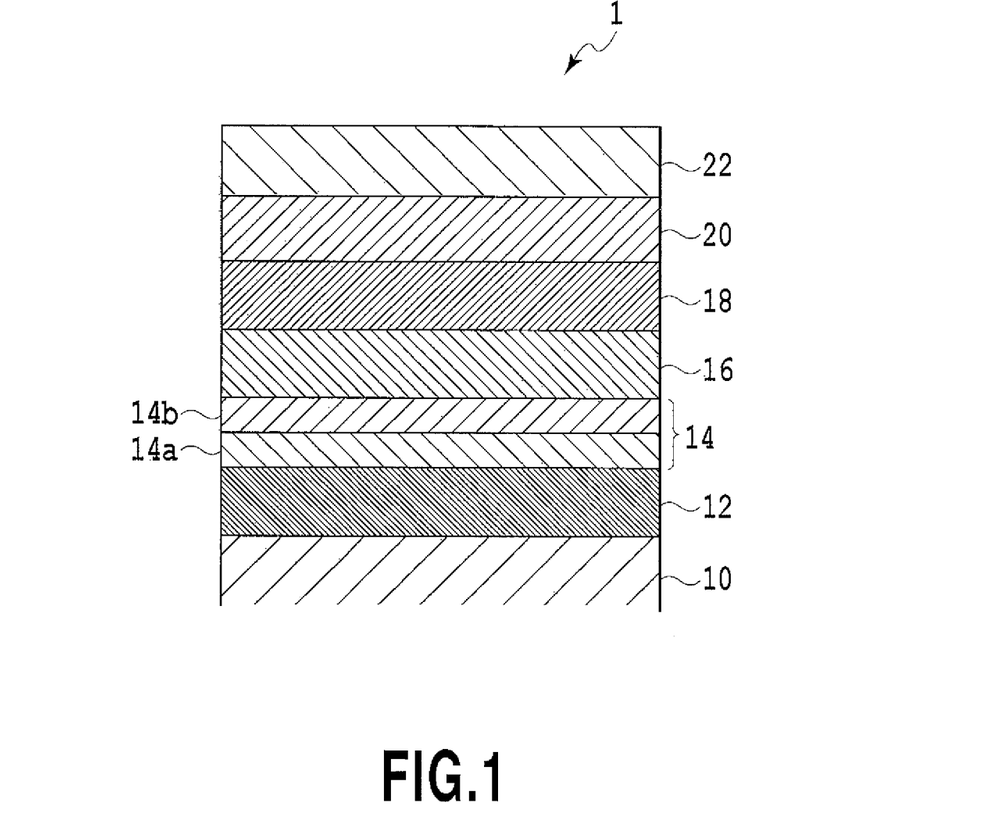
FIG. 1 is a schematic sectional view for illustrating a configuration example of a perpendicular magnetic recording medium of the present invention.

FIG. 1 is a schematic sectional view for illustrating a configuration example of a perpendicular magnetic recording medium of the present invention. In FIG. 1, a nonmagnetic seed layer 14, a nonmagnetic underlayer 16, and a magnetic layer 18 are formed in this order on a nonmagnetic substrate 10.

The nonmagnetic substrate 10 is a constituent placed at the lowest portion of a perpendicular magnetic recording medium 1 and configured to support the other constituents of the magnetic recording medium. The other constituents are sequentially formed on the nonmagnetic substrate 10 and will be described later. As the nonmagnetic substrate 10, for example, it is possible to use an Al substrate, a surface-oxidized Si wafer, a silica glass substrate, a plastic resin substrate, or the like. Note that, in Examples and Comparative Examples described later, substrates used for manufacturing perpendicular magnetic recording media are all 2.5-inch glass disks, but the material of the nonmagnetic substrate is not limited to the aforementioned examples.

On the nonmagnetic substrate 10, a soft magnetic backing layer 12 may be formed optionally. The soft magnetic backing layer 12 is a constituent configured to sufficiently secure a magnetic field in a perpendicular direction so as to prevent spread of a magnetic flux generated from a head at the time of recording information. As the material of the soft magnetic backing layer 12, a Ni alloy, a Fe alloy, or a Co alloy, may be used. Particularly, the use of amorphous Co—Zr—Nb, Co—Ta—Zr, Co—Ta—Zr—Nb, Co—Fe—Nb, Co—Fe—Zr—Nb, Co—Ni—Fe—Zr—Nb, Co—Fe—Ta—Zr—Nb, and the like can produce good electromagnetic conversion characteristics.

In the perpendicular magnetic recording medium 1 of FIG. 1, the nonmagnetic seed layer 14 is formed on the soft magnetic backing layer 12. The nonmagnetic seed layer 14 is a constituent placed and configured to suitably control the orientation of the nonmagnetic underlayer 16 formed as an upper layer on the seed layer 14, thereby achieving a good perpendicular orientation of the magnetic layer 18. The nonmagnetic seed layer 14 includes a MgO layer (may also be called first seed layer) 14a and a metal layer (may also be called second seed layer) 14b having a body-centered cubic (bcc) structure. Here, all of a (001) crystal lattice plane of the metal layer 14b, a (001) crystal lattice plane of a NaCl type structure in the nonmagnetic underlayer 16 to be described later, and a (001) crystal lattice plane of an $L1_0$ type ordered structure in the magnetic layer 18 to be described later are preferably parallel to a film surface. Moreover, the MgO layer 14a disposed under the metal layer 14b preferably has a thickness within a range appropriately designed to achieve aforementioned crystal lattice planes arrangement to meet desired magnetic properties.

The nonmagnetic underlayer 16 is a constituent placed and configured to improve the orientation of the magnetic layer 18 to be described later, control the grain diameter of the magnetic layer 18, and restrict generation of an initial growth layer at the time of forming the magnetic layer 18. In order for the nonmagnetic underlayer 16 to demonstrate such functions sufficiently, the structure needs to be considered while taking into account appropriate control of the crystal structure and the crystal orientation of the magnetic layer 18 growing on the nonmagnetic underlayer 16. For example, when an $L1_0$-FePt ordered alloy is used for the magnetic layer 18, the FePt (002) plane has to be arranged parallel to the film surface. Accordingly, the material of the nonmagnetic underlayer 16 preferably has the same crystal structure as that of the magnetic layer 18 and has a (002) plane arranged parallel to the film surface.

The magnetic layer 18 is a constituent placed and configured to record information. The magnetic layer 18 may be a single layer or have a laminated structure of two or more layers. In the present invention, the magnetic layer includes an alloy selected from the group consisting of FePt, FePd, and CoPt having an $L1_0$ type ordered structure. The magnetic layer may have a granular structure.

A protective layer 20 may be formed on the magnetic layer 18. The protective layer 20 is a constituent placed and configured to protect the magnetic layer 18 and the layers located below in a cross-sectional view of the perpendicular magnetic recording medium 1 in FIG. 1, and particularly when the magnetic layer 18 is a granular film, prevent elution of a ferromagnetic element from the magnetic layer 18. For the protective layer 20, it is possible to use materials normally used in a perpendicular magnetic recording medium. Examples are the materials made mainly of carbon such as diamond-like carbon (DLC) or amorphous carbon (preferably, diamond-like carbon (DLC)), or various thin layer materials known to be used for a protective layer of a magnetic recording medium. The thickness of the protective layer 20 may be equal to a thickness of a constituent normally adopted in a perpendicular magnetic recording medium.

Additionally, a liquid lubricant layer 22 may be formed on the protective layer 20. Although an optional constituent, the liquid lubricant layer 22 is a liquid constituent placed and configured to reduce a friction force generated between the protective layer 20 and a head unillustrated in FIG. 1 so as to obtain excellent durability and reliability of the perpendicular magnetic recording medium 1. As the material for the liquid lubricant layer 22, it is possible to use materials normally used in a perpendicular magnetic recording medium. Examples of the materials include perfluoropolyether lubricants and the like. The thickness of the liquid lubricant layer 22 may be equal to a thickness of a constituent normally adopted in a perpendicular magnetic recording medium. The liquid lubricant layer 22 can be formed by using any coating method known in the art such as a dip coating method and a spin coating method.

EXAMPLES

In order to confirm the effects of the present invention, experiments were conducted in Examples and Comparative Examples described below. Table 1 summarizes a seed layer, an underlayer, and a magnetic layer used in each example as well as an obtained anisotropic energy ($K_u$) value of the magnetic layer.

Example 1

Samples were prepared as follows using an ultra-high vacuum (UHV) DC/RF magnetron sputtering system (ANELVA, E8001). The ultimate vacuum degree before the start of the film formation was set at $7.0 \times 10^{-7}$ Pa or less. An ultra-high purity Ar gas having an impurity concentration of 2 to 3 ppb was used as the process gas.

In order to increase the adhesion strength to the substrate, Ta was deposited to 5 nm on a glass substrate serving as the nonmagnetic substrate. MgO was deposited on Ta to thus form a MgO layer. The thickness of MgO was varied from 0.2 to 10 nm. Then, Cr was deposited to 20 nm as the second nonmagnetic seed layer on each of the MgO layers. Note that Reference Example was designed in which the MgO layer had a thickness of 0 nm. Here, Cr was used merely as an example of a material having a body-centered cubic structure, and the selection does not particularly influence the effect of this Example. MgO was formed to 20 nm as the nonmagnetic underlayer on Cr. Ar was used as the process gas for all the film formation from the Ta layer to the MgO layer serving as the nonmagnetic underlayer. The gas pressure during the film formation was set at 0.3 Pa. In addition, for the formation of the MgO layer, materials containing Mg and O at 1:1 were used as a target, and the thin film was formed by RF sputtering. During the thin film formation, only Ar was used as the gas, and no oxygen was added. The peak position of XRD (X-ray Diffraction) on the thin film thus formed agreed well with that of MgO. In addition, the composition analysis using EDX (Energy Dispersive X-ray Spectrometer) also confirmed that the thin film was made of the materials containing Mg and O at 1:1. Furthermore, by sputtering Fe and Pt simultaneously, a FePt alloy was formed as the magnetic layer to 10 nm. Although the composition of FePt can be adjusted by changing the power applied to the Fe and Pt targets, EDX revealed that the composition of the FePt alloy thin film in this Example contained 55 at. % of Fe and 45 at. % of Pt. Note that

TABLE 1

| | Gas impurity concentration | Vacuum degree before film formation (Pa) | $K_u$ (×10$^7$ erg/cm$^3$) | First nonmagnetic seed layer (nm) | Second nonmagnetic seedlayer (nm) | Nonmagnetic underlayer (nm) | Magnetic layer (nm)/ substrate temperature |
|---|---|---|---|---|---|---|---|
| Reference Example | 2 to 3 ppb | <7.0 × 10$^{-7}$ | 0.40 | MgO (0) | Cr (20) | MgO (20) | FePt (10)/R.T. to 350° C. |
| Example 1 | 2 to 3 ppb | <7.0 × 10$^{-7}$ | 0.30 to 3.54 | MgO (0.2 to 10) | Cr (20) | MgO (20) | FePt (10)/R.T. to 350° C. |
| Example 2 | 2 to 3 ppb | <7.0 × 10$^{-5}$ | 0.91 to 3.50 | MgO (1) | Cr (20) | MgO (20) | FePt (10)/R.T. to 350° C. |
| Example 3 | 2 to 3 ppb | <7.0 × 10$^{-7}$ | 0.91 to 3.54 | MgO (1) | Cr (0 to 50) | MgO (20) | FePt (10)/ 350° C. |
| Example 4 | 2 to 3 ppb | <7.0 × 10$^{-7}$ | 3.45 | MgO (1) | Ta (20) | MgO (20) | FePt (10)/ 350° C. |
| Example 5 | 2 to 3 ppb | <7.0 × 10$^{-7}$ | 1.23 | MgO (1) | Cr (20) | TiN (20) | FePt (10)/ 200° C. |
| Example 6 | 2 to 3 ppb | <7.0 × 10$^{-7}$ | 1.13 | MgO (1) | Cr (20) | CrN (20) | FePt (10)/ 200° C. |
| Example 7 | 2 to 3 ppb | <7.0 × 10$^{-7}$ | 1.23 | MgO (1) | Cr (20) | MgO (20) | FePd (10)/ 350° C. |
| Example 8 | 2 to 3 ppb | <7.0 × 10$^{-7}$ | 1.67 | MgO (1) | Cr (20) | MgO (20) | CoPt (10)/ 350° C. |
| Comparative Example 1 | 2 to 3 ppm | <7.0 × 10$^{-7}$ | 0.20 to 0.54 | MgO (0 to 10) | Cr (20) | MgO (20) | FePt (10)/R.T. to 350° C. |
| Comparative Example 2 | 2 to 3 ppm | <7.0 × 10$^{-5}$ | 0.02 to 0.04 | MgO (1) | Cr (20) | MgO (20) | FePt(10)/R.T. to 350° C. |
| Comparative Example 3 | 2 to 3 ppb | <7.0 × 10$^{-7}$ | 0.89 | N/A | Pt (10) | N/A | FePt (10)/ 350° C. |
| Comparative Example 4 | 2 to 3 ppb | <7.0 × 10$^{-7}$ | 0.79 | N/A | Ru (20) | N/A | FePt (10)/ 350° C. | this composition is merely an example, and as long as an $L1_0$ phase is formed in FePt, the effects described later can be demonstrated presumably. The substrate temperature during the formation of the magnetic layer was set from room temperature to 350° C., and the Ar gas pressure during the film formation was set at 3.0 Pa.

Then, to protect the film surface, Ta (5 nm)/Pt (2 nm) were formed at an Ar gas pressure of 0.3 Pa. Note that the film formation conditions described here are merely examples, and do not particularly influence the effect of this Example.

Example 2

A FePt perpendicular magnetic recording medium was formed under the same conditions as in Example 1 other than the conditions described below. Among the condition to deposit the MgO layer on Ta at a thickness of 1 nm in Example 1, which is Example 1-1, only the ultimate vacuum degree before the start of the film formation was degraded to approximately $7.0 \times 10^{-5}$ Pa without changing the purity of the gas impurity in the order of ppb.

Example 3

As the second nonmagnetic seed layer, Cr was varied in thickness from 0 to 50 nm, and the substrate temperature during the formation of the magnetic layer was set at 350° C. A FePt perpendicular magnetic recording medium was formed under the same conditions other than the above as those in Example 1-1.

Example 4

As the second nonmagnetic seed layer, Ta was deposited to 20 nm, and the substrate temperature during the formation of the magnetic layer was set at 350° C. A FePt perpendicular magnetic recording medium was formed under the same conditions other than the above as those in Example 1-1.

Example 5

TiN was used as the underlayer material, and the substrate temperature during the FePt formation was set at 200° C. For the TiN formation, materials containing Ti and N at 1:1 were used as the target. During the film formation, only Ar was used as the process gas, and no nitrogen gas was added. The Ar gas pressure during the film formation was set at 0.3 Pa. The XRD peak position and the composition analysis result with EDX confirmed that the composition of the formed thin film was of the materials containing Ti and N at 1:1. A FePt perpendicular magnetic recording medium was formed under the same conditions other than the above as those in Example 1-1.

Example 6

CrN was used as the underlayer material, and the substrate temperature during the FePt formation was set at 200° C. For the CrN formation, materials containing Cr and N at 1:1 were used as the target. During the film formation, only Ar was used as the process gas, and no nitrogen gas was added. The Ar gas pressure during the film formation was set at 0.3 Pa. The XRD peak position and the composition analysis result with EDX confirmed that the composition of the formed thin film was of the materials containing Cr and N at 1:1. A FePt perpendicular magnetic recording medium was formed under the same conditions other than the above as those in Example 1-1.

Example 7

FePd was used for the magnetic layer. The EDX result revealed that the composition of the FePd layer contained 50 at. % of Fe and 50 at. % of Pd. The effect obtained in this Example will be presumably always demonstrated, as long as an $L1_0$ phase is formed in FePd. The substrate temperature during the formation of the magnetic layer was set at 350° C. A FePd perpendicular magnetic recording medium was formed under the same conditions other than the above as those in Example 1-1.

Example 8

CoPt was used for the magnetic layer. The EDX result revealed that the composition of the CoPt layer contained 50 at. % of Co and 50 at. % of Pt. The effect obtained in this Example will be presumably always demonstrated, as long as an $L1_0$ phase is formed in CoPt. The substrate temperature during the formation of the magnetic layer was set at 350° C. A CoPt perpendicular magnetic recording medium was formed under the same conditions other than the above as those in Example 1-1.

Comparative Example 1

A low-purity gas having an impurity concentration of 2 to 3 ppm was used as the process gas, and the thickness of the MgO layer was varied from 0 to 10 nm. FePt perpendicular magnetic recording media were formed under the same conditions other than the above as those in Example 1.

Comparative Example 2

The vacuum degree before the film formation was lowered to approximately $7.0 \times 10^{-5}$ Pa, and a low-purity gas having an impurity concentration of 2 to 3 ppm was used as the process gas. A FePt perpendicular magnetic recording medium was formed under the same conditions other than the above as those in Example 1-1.

Comparative Example 3

In order to increase the adhesion strength of a thin film, Ta was deposited to 5 nm on the glass substrate. Pt was deposited to 10 nm thereon at an Ar gas pressure of 0.3 Pa. The magnetic layer was formed thereon while the substrate temperature during the formation of the magnetic layer was set at 350° C. A FePt thin film was formed under the same conditions other than the above as those in Example 1.

Comparative Example 4

In order to increase the adhesion strength of a thin film, Ta was deposited to 5 nm on the glass substrate. Ru was deposited to 20 nm thereon at an Ar gas pressure of 0.3 Pa. The magnetic layer was formed thereon while the substrate temperature during the formation of the magnetic layer was set at 350° C. A FePt thin film was formed under the same conditions other than the above as those in Example 1.

Figure 2:
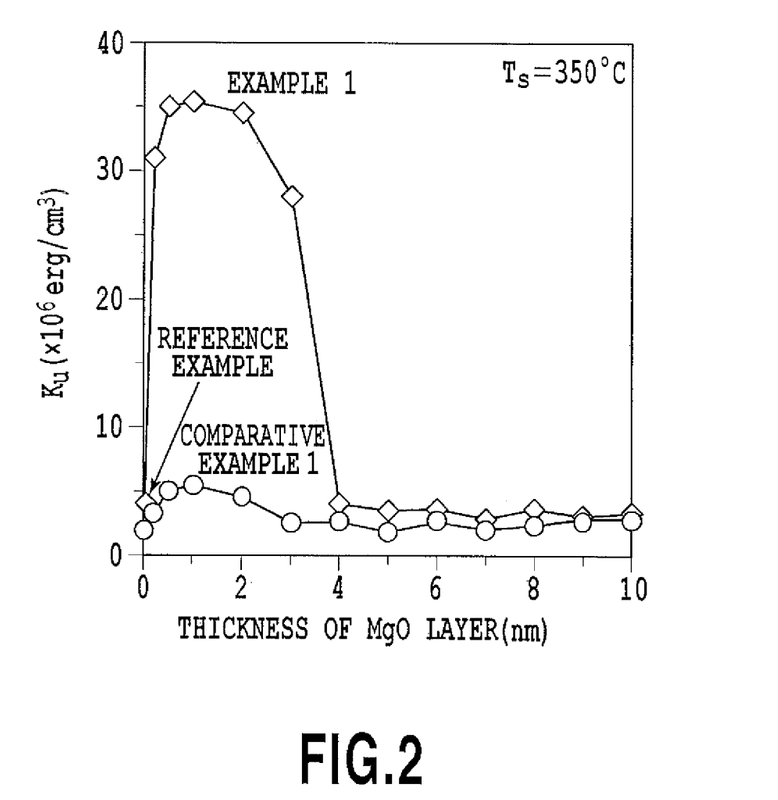
FIG. 2 shows a dependency of a $K_u$ value on the thickness of a MgO layer in Reference Example, Example 1, and Comparative Example 1.

FIG. 2 shows $K_u$ values of samples obtained in Example 1 and Comparative Example 1 in relation to the thickness of the MgO layer used as the first seed layer. In Example 1 in which the impurity concentration of the process gas was in the order of ppb, the $K_u$ value showed large values when the MgO layer thickness was in the range from 0.2 to 3.0 nm. Particularly, the $K_u$ value showed a large value exceeding $3\times10^7$ erg/cm$^3$ when the MgO layer thickness was in the range of 0.2 to 2.0 nm. In contrast, in Comparative Example 1 in which the impurity concentration of the process gas was in the order of ppm, the $K_L$ value was below $1.0\times10^7$ erg/cm$^3$ regardless of the thickness of the MgO layer.

Figure 3:
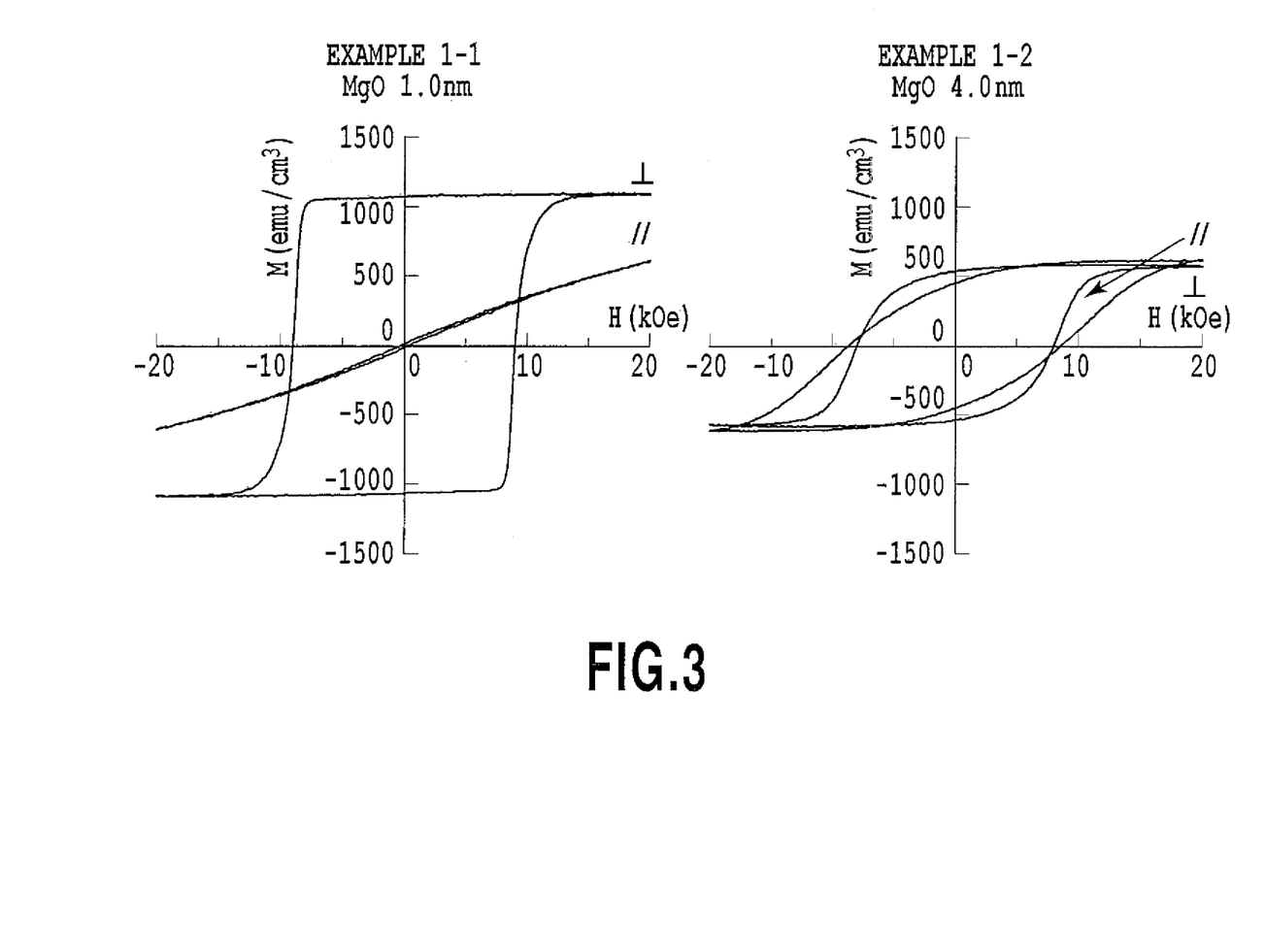
FIG. 3 shows magnetization curves of samples in Example 1. The thickness of MgO layers are 1.0 nm for Example 1-1 and 4.0 nm for Example 1-2, respectively.

Here, in order to reveal the relation between the crystal orientation plane and magnetic properties, the result of Example 1 was further examined. FIG. 3 shows the result of measured magnetization curves of samples in Example 1, the samples having a thickness of 1.0 nm (Example 1-1, left in the drawing) and 4.0 nm (Example 1-2, right in the drawing), respectively. The magnetization curves of each sample are the results of measurement with a magnetic field applied perpendicularly to the film surface (⊥) and of measurement with a magnetic field applied parallel to the film surface (//). The sample of the MgO layer having a thickness of 1.0 nm (Example 1-1) showed a strong anisotropy in the perpendicular direction. This suggests that the sample is suitable as a material for perpendicular magnetic recording media. Meanwhile, regarding the sample of the MgO layer having a thickness of 4.0 nm (Example 1-2), the shapes of the magnetization curves were almost the same regardless of the direction in which the magnetic field was applied, and an anisotropy in the perpendicular direction was not observed. XRD measurement was performed on both of the samples. As a result, in the sample of the MgO layer having a thickness of 1.0 nm, diffraction lines were observed only from the MgO (002) plane and the Cr (002) plane. Regarding FePt grown on the crystal lattice plane, diffraction lines were observed only from the FePt (001) plane and (002) plane, whereas no diffraction line was observed from the other crystal orientation planes. In contrast, in the sample of the MgO layer having a thickness of 4.0 nm, diffraction lines were observed from the Cr (110) plane in addition to the Cr (002) plane. Regarding the MgO layer serving as the nonmagnetic underlayer grown on Cr also, diffraction lines were observed from the MgO (111) plane in addition to the MgO (002) plane. Regarding FePt grown on the MgO layer serving as the nonmagnetic underlayer also, diffraction lines were observed from the (111) plane in addition to the FePt (001) plane and (002) plane.

Figure 4:
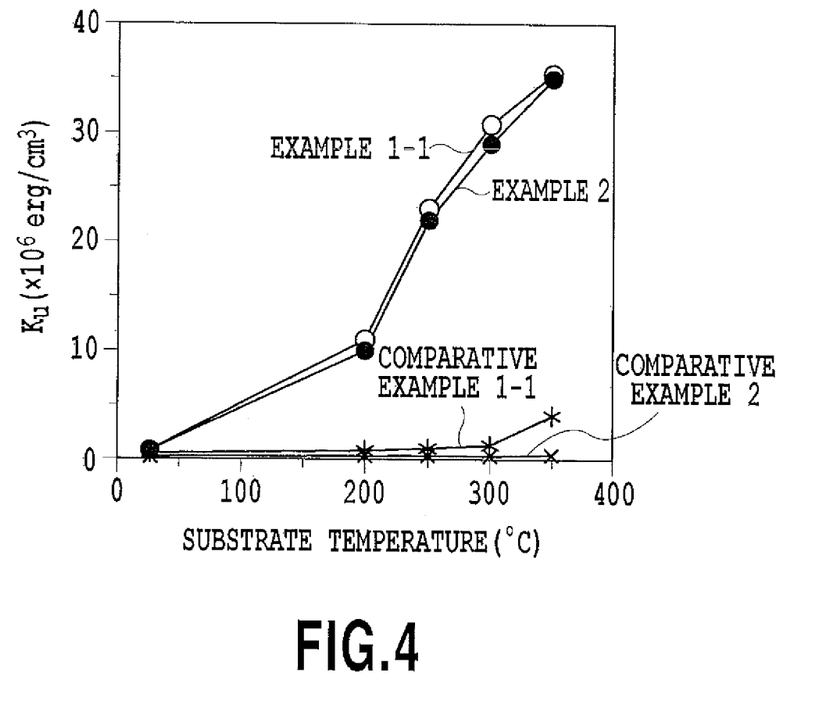
FIG. 4 shows a dependency of a $K_u$ value on a substrate temperature during FePt film formation in Examples 1-1, 2 and Comparative Examples 1-1, 2.

Next, examined was the influence on the low-temperature formation of $L1_0$ type ordered alloys prepared by changing the substrate temperature under conditions of various process-gas purities and vacuum degrees. FIG. 4 shows $K_u$ values of samples obtained in Examples 1-1, 2 as well as Comparative Example 1 in which the MgO layer had a thickness of 1 nm (i.e., Comparative Example 1-1), and Comparative Example 2 in relation to the substrate temperature during the FePt film formation. The thickness of the MgO thin film deposited on Ta used here was selected to be 1 nm, as stated above, by which the $K_u$ value became maximum as illustrated in FIG. 2.

In Examples 1-1 and 2 in which the impurity concentration of the process gas was in the order of ppb and only the vacuum degree before the film formation was different from each other, the ordering progressed from 200° C., and a $K_u$ value on a level of $10^7$ erg/cm$^3$ was obtained. Meanwhile, in Comparative Example 1-1 in which the impurity concentration was in the order of ppm under a high vacuum degree condition where the vacuum degree before the film formation was as high as $10^{-7}$ Pa, an increase in the $K_u$ value due to the ordering started progressing at a temperature of around 350° C. was observed, but the magnitude of the $K_u$ value was as small as $0.4\times10^7$ erg/cm$^3$. Meanwhile, in Comparative Example 2 in which both of the gas purity and the vacuum degree before the film formation were inferior, no progress of the ordering was confirmed in the examined substrate temperature zone. In the above results, lowering the impurity concentration of the process gas to the order of ppb produced the effect of precipitating Pt on the top layer in the thin film growth process as described in Non-Patent Literatures 4, 5. As a result, the (002) orientation was achieved, in which the monoatomic layers of Fe and Pt were alternately stacked, presumably leading to the low-temperature formation of $L1_0$ phase with the easy axis of magnetization oriented in the perpendicular direction.

Moreover, it can be seen from the results of Examples 1-1, 2 that the low-temperature formation of $L1_0$ phase does not rely on the vacuum degree before the film formation within the examined range. The behavior demonstrated is different from that of a metastable $L1_1$ type, and this result is presumably due to the fact that the $L1_0$ phase is a stable phase. The fact that lowering the impurity gas concentration of the process gas enables low-temperature formation of $L1_0$ phase leads to simplification of film forming systems for mass production. Thus, the merit is presumably greater than that of forming an $L1_1$ type ordered alloy.

Herein, whether a thin film in which a fcc (111) plane or hcp (002) plane used in an $L1_1$ type ordered alloy oriented parallel to the film surface is effective or not for an $L1_0$ type ordered alloy with the easy axis of magnetization oriented in the perpendicular direction was checked by the experiment described in Comparative Example 3.

Figure 5:
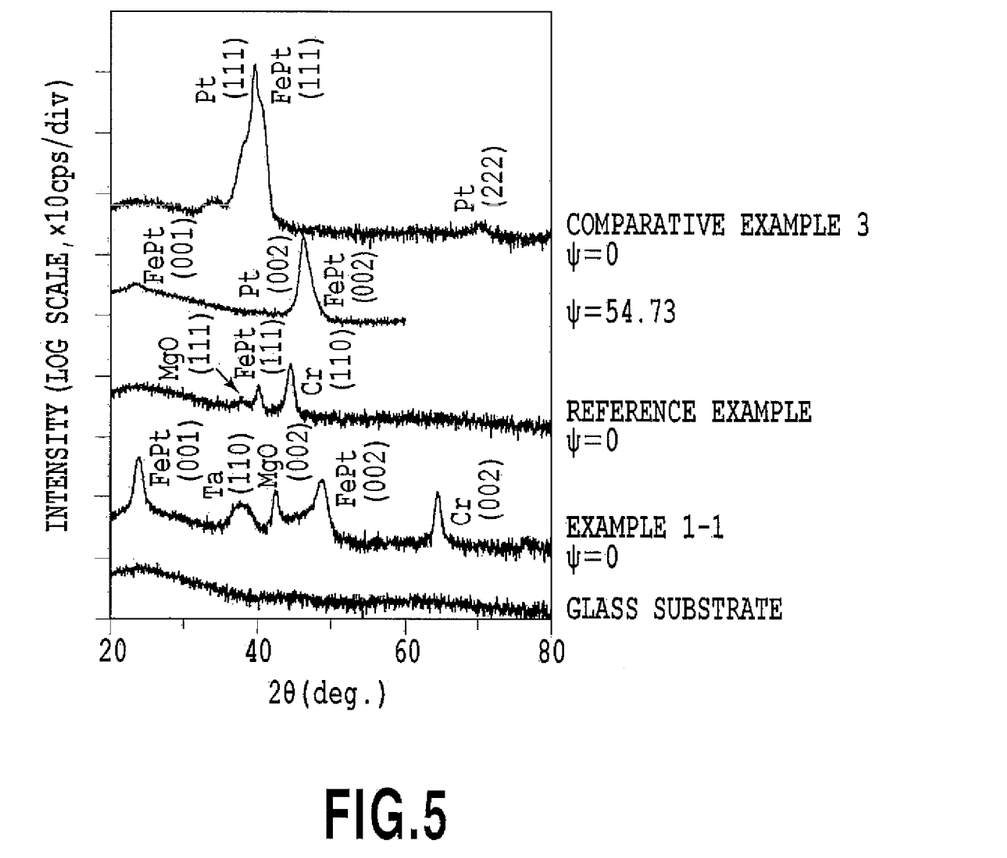
FIG. 5 shows XRD results of the samples obtained in Reference Example, Example 1-1, and Comparative Example 3.

FIG. 5 shows the XRD measurement result of samples obtained in Reference Example, Example 1-1, and Comparative Example 3. Here, in order to clearly observe the influence of the crystal orientation plane on magnetic properties, the experiment was conducted at 350° C. at which the ordering progressed the most in this study. The magnetic properties are closely related to the crystal orientation plane, and the temperature set here does not particularly influence the effect of this Example.

In Example 1-1 in which the MgO (002) plane was used in the underlayer, diffraction lines were observed from the FePt (001) and (002) plane, and no diffraction line was observed from the other planes of FePt. Reference Example was an example in which Cr was the metal layer serving as the second seed layer, and the (110) plane, the close-packed plane, was formed parallel to the film surface (the example corresponds to an example of Example 1 in which the MgO layer as the first seed layer has a thickness of 0 nm). In Reference Example, diffraction lines from the (110) plane (the close-packed plane) of Cr, the (111) plane of MgO serving as the nonmagnetic underlayer, and the (111) plane (the close-packed plane) of FePt were observed at 2θ=around 44°, around 37°, and around 41°, respectively. No diffraction line was observed from the other planes. Reference Example revealed that if the (001) crystal lattice plane of the second seed layer were not formed parallel to the film surface, the (001) crystal lattice plane of the nonmagnetic underlayer (in this case, MgO) would not be formed parallel to the film surface. Furthermore, it was revealed that in such a case, the (001) crystal lattice plane of FePt would not be formed parallel to the film surface. Meanwhile, in Comparative Example 3 using the thin film in which the fcc type Pt (111) plane serving as the layer immediately below the magnetic layer was oriented parallel to the film surface, an diffraction line was observed only from the FePt (111) plane. Here, in order to check whether or not the ordering of FePt had progressed, the XRD measurement was performed while the sample was inclined at an angle of 54.73° formed between the FePt (001)

plane and (111) plane in such a manner that the (001) plane faced the front (illustrated as Ψ=54.73 (degrees) in the drawing). In this event, a diffraction line from the FePt (001) plane resulting from the ordering was observed at 2θ=around 24°. Thus, it was revealed in Comparative Example 3 that the ordering of FePt progressed, but the crystal orientation plane was not the (002) plane, so that the easy axis of magnetization was not oriented in the perpendicular direction. Meanwhile, in Comparative Example 4, Ru having an hcp type crystal structure was used for the layer immediately below the magnetic layer. Both of the hcp type and the fcc type were very similar to each other in atomic arrangement of the crystals, and the result was the same as that of Comparative Example 3.

It can be seen from the above results that, to promote the ordering in the low temperature zone of 350° C. or lower and to form a perpendicular magnetic recording medium having a large $K_u$ value exceeding $1.0\times10^7$ erg/cm$^3$, the impurity concentration of the process gas is preferably in the order of ppb. In addition to this, it can be seen that both of the (001) crystal lattice plane of the nonmagnetic underlayer having a NaCl type structure and the (001) crystal lattice plane of the second nonmagnetic seed layer having a bcc structure are preferably formed parallel to the film surface, and that the (001) crystal lattice plane of the L1$_0$ type ordered structure is preferably formed parallel to the film surface. This makes it possible to reduce the thickness of the MgO layer used as the first seed layer while the orientation is being kept.

Next, in order to confirm the change in properties in relation to the thickness of the metal layer Cr used as the second seed layer, the thickness of the metal layer Cr in Example 1-1 was varied from 0 to 50 nm. The obtained result was illustrated as Example 3.

Figure 6:
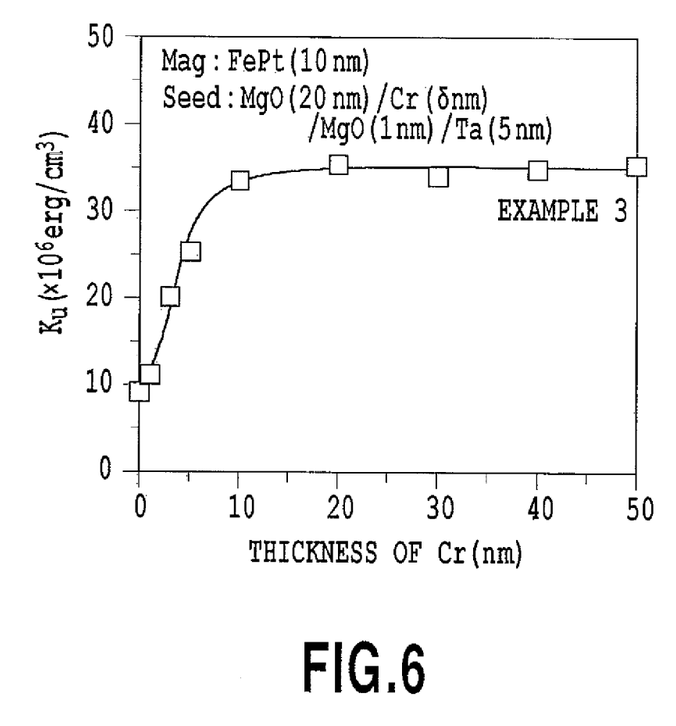
FIG. 6 shows a dependency of a $K_u$ value of a FePt thin film on a Cr film thickness in Example 3.

FIG. 6 shows the change in the $K_u$ value of samples obtained in Example 3 in relation to the Cr thickness. In this event, the substrate temperature during the formation of the magnetic layer was set constant at 350° C. In the state in which Cr was not deposited, the crystal orientation of the (002) plane of MgO used as the underlayer was inferior and not preferable to be used for a perpendicular magnetic recording medium. Nevertheless, depositing Cr to only 1 nm improved the crystal growth of MgO, and the $K_u$ value also exceeded $1.0\times10^7$ erg/cm$^3$ and became $1.1\times10^7$ erg/cm$^3$. With the thickness of Cr being 10 nm or larger, the $K_u$ value substantially stayed constant. This is presumably because the influence of the Cr structure on magnetic properties of FePt reached the plateau.

To confirm the effect of this Example on bcc alloy materials other than Cr, Table 2 shows: the surface energy values of various bcc-based materials regarding the (110) plane which is the close-packed plane, and the (002) plane that is the desired plane for forming perpendicular media; the surface energy difference between the two; and the possibility of (002) orientation. Note that the numerical values shown in the table are values described in Non-Patent Literature 6.

TABLE 2

| Material | Cr | Fe | Nb | V | Ta |
|---|---|---|---|---|---|
| Surface energy of (110) plane (erg/cm$^2$) | 2198 | 2356 | 2490 | 2636 | 2778 |
| Surface energy of (002) plane (erg/cm$^2$) | 2300 | 2510 | 2715 | 2778 | 3035 |
| Surface energy difference between (002) plane and (110) plane (erg/cm$^2$) | 102 | 154 | 225 | 142 | 257 |
| Possibility of (002) orientation | possible | — | — | — | possible |

Figure 7:
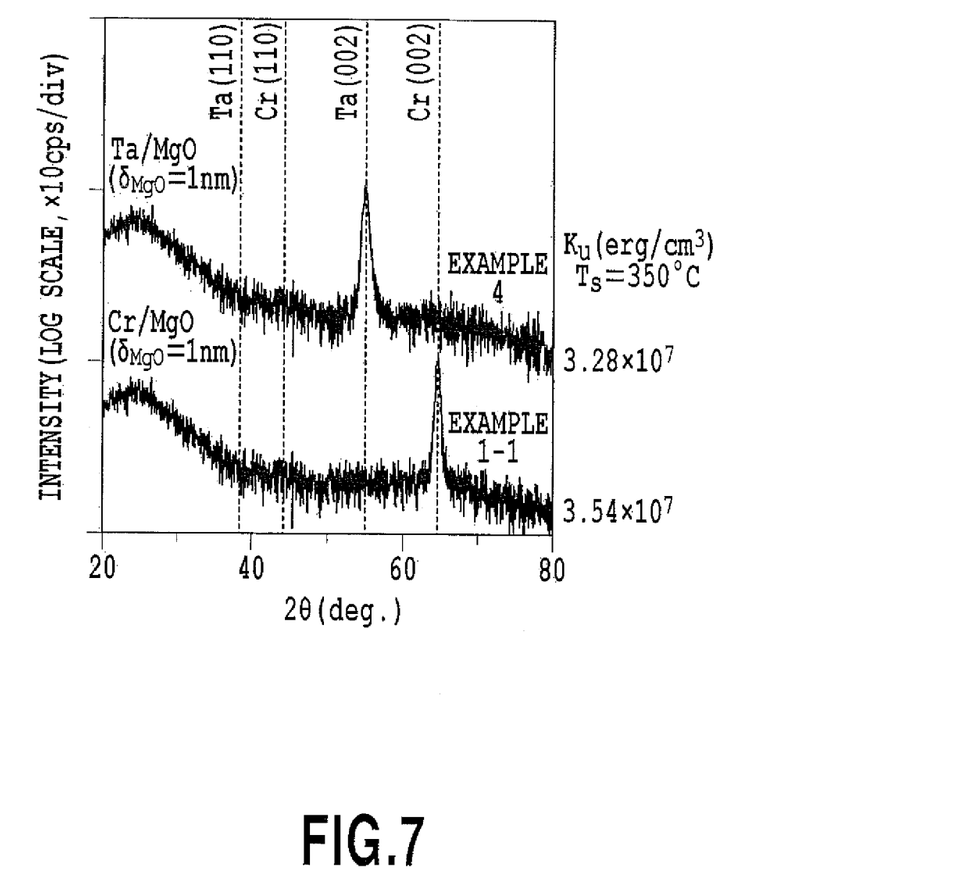
FIG. 7 shows XRD results of the samples each obtained by forming Cr or Ta on a 1 nm MgO layer in Examples 1-1 and 4.

Moreover, FIG. 7 shows the XRD results of samples prepared up to the second nonmagnetic seed layer. In order to check the orientation state of the second nonmagnetic seed layer having a bcc structure other than Cr, shown are the XRD result of a sample in Example 4 together with a sample in Example 1-1 prepared up to the Cr metal layer (second seed layer). Example 4 in FIG. 7 is an example in which Ta having the maximum surface energy of the (002) plane among the materials shown in Table 2 was used, and the thin film was formed up to Ta metal layer (second seed layer) under the conditions in Example 1-1. Moreover, the drawing also shows the $K_u$ values of the samples each having a 10-nm FePt thin film deposited. Note that the substrate temperature during the FePt-thin film formation was set at 350° C. In this example, regarding Cr having the minimum surface energy and Ta having the maximum surface energy, the (002) plane other than the close-packed plane was obtained by the film formation at room temperature. For this reason, the same results can be obtained from elemental metals such as Fe, Nb, and V having an intermediate surface energy among the above materials and having a smaller surface energy difference between the (002) plane and the (110) plane than Ta. Further, all of the bcc-based materials shown in Table 2 form complete solid solutions. When an alloy is prepared, the surface energy value is larger than that of Cr but smaller than that of Ta. In the case of alloys also, the (002) plane can be obtained stably at room temperature according to the present invention. As to FePt grown thereabove also, only the (001) plane and (002) plane can grow parallel to the film surface. In addition, when Cr was the second nonmagnetic seed layer, the $K_u$ value was $3.54\times10^7$ erg/cm$^3$, but $3.28\times10^7$ erg/cm$^3$ in the case of Ta; thus, the two were not greatly different from each other. This revealed that if the orientation state of the underlayer were appropriate and the surface energy difference were within a predetermined range, a large $K_u$ value could be obtained regardless of the material.

Figure 8:
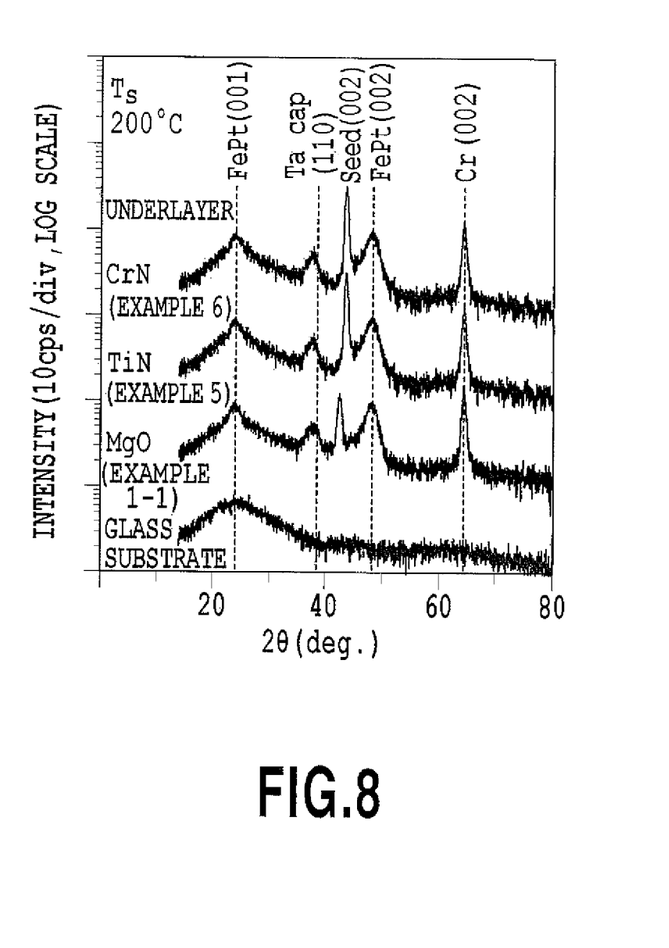
FIG. 8 shows XRD results of FePt thin films formed on various nonmagnetic underlayers.

The effect of forming an ordered alloy at low temperature was checked when materials having a NaCl type crystal structure other than MgO were used for the underlayer. Specifically, the underlayer material was altered to TiN and CrN having the same NaCl type crystal structure as MgO, and these were respectively illustrated as Examples 5, 6. In order to check the effect on the ordering at lower temperature, the substrate temperature during the FePt formation was set at 200° C., the substrate temperature was similarly set at 200° C. in Example 1 as well. From the XRD measurement results shown in FIG. 8, a diffraction peak due to the ordering was observed at around 2θ=24° in all of the underlayer materials. It was revealed that the ordering of FePt progressed from a low temperature zone of 200° C.

Finally, in order to check the effect of L1$_0$ type ordered alloys other than FePt, samples were prepared using FePd and CoPt as the magnetic layer material. These were respectively illustrated as Examples 7, 8.

Figure 9:
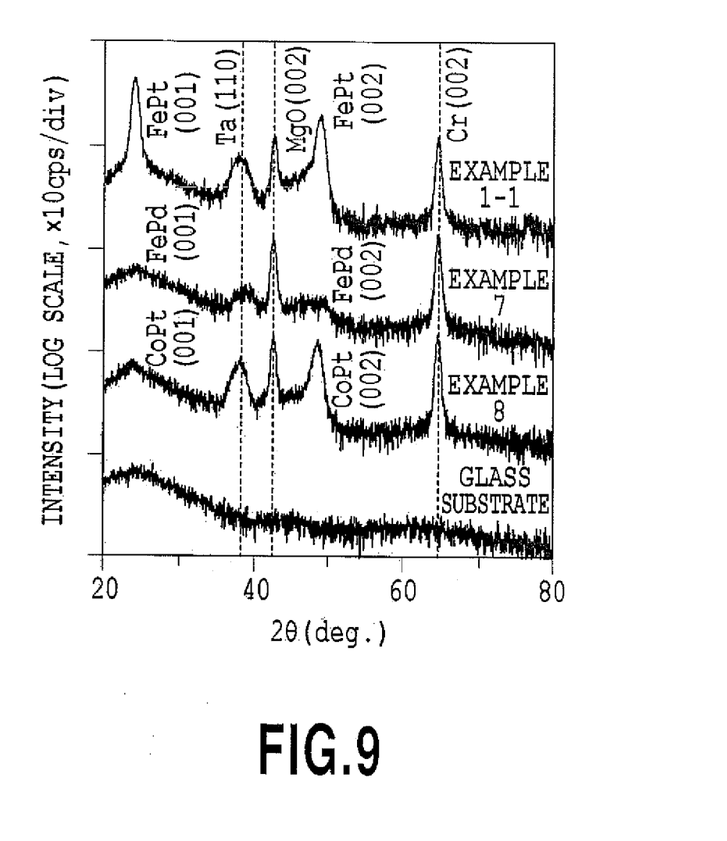
FIG. 9 shows XRD results of various $L1_0$ type ordered alloys each formed on a MgO layer.

FIG. 9 shows the XRD measurement results when the substrate temperature during the film formation with various magnetic layer materials was set at 350° C. in Examples 1-1, 7, 8. Note that, as described above, the thickness of the MgO layer used as the first seed layer was set at 1.0 nm in Example 1-1. A diffraction peak due to the ordering was observed in all of the magnetic layer materials having an $L1_0$ structure. It was revealed that an $L1_0$ ordered structure was effectively obtained by forming the underlayer and the magnetic layer using the seed layer obtained in the present invention. In consideration of this together with the result shown in FIG. 8, presumably any $L1_0$ type ordered alloy can be formed regardless of the underlayer material.

In the end, effects brought by the findings obtained in Examples will be described.

According to the system of this application, by setting the process gas impurity in the order of ppb, the seed layer and the underlayer necessary to orient the easy axis of magnetization of FePt in the perpendicular direction can be formed without heating. The process gas impurity concentration is preferably set at 5 ppb or lower. This leads to an improvement in mass production efficiency.

In consideration of raising recording density of a perpendicular magnetic recording medium, essential in raising the recording density are shortening the distance between a recording head and a soft magnetic backing layer, efficient flowing of a writing magnetic field generated by the head into the soft magnetic backing layer, and increasing recording-magnetic field intensity and gradient. Thus, the nonmagnetic underlayer and the seed layer have to be formed thin inevitably. According to the present invention, it is apparent that a FePt thin film having a large $K_u$ value can be formed with MgO in the thickness zone of 5 nm or smaller and Cr in the thickness zone of 100 nm or smaller, which are not described in Non-Patent Literature 3. Nevertheless, in order to reduce a space between the head and the soft magnetic backing layer, the thickness of the metal layer (for example, Cr) having a bcc structure is at most approximately 50 nm. Moreover, in order to achieve a recording density exceeding 1 T bit/in$^2$, a magnetic material having a $K_u$ value on a level of $10^7$ erg/cm$^3$ is preferable from the viewpoint of securing thermal stability because of finer magnetic crystal grains. From the above, in consideration of the required $K_u$ value and the results obtained in the present invention, the thickness of a metal layer having a bcc structure is preferably 1 nm at minimum. As a result, it is preferable to use a metal layer having a bcc structure of 1 nm to 50 nm both inclusive as the second nonmagnetic seed layer.

Meanwhile, Patent Literature 10 proposes a FePt thin film having an orientation-control layer formed of two different layers as in the case of the present invention. In the medium proposed there, a magnetic layer is a mixed phase of $L1_0$ FePt and FePt$_3$, and has a structure in which paramagnetic FePt$_3$ is precipitated at crystal grain boundaries. In contrast, in the present invention proposed, the magnetic layer is formed of FePt alone. As a result of using high-purity Ar, the present invention is advantageous because a thin film having a larger $K_u$ value than the thin film proposed in Patent Literature 10 is successfully formed.

In consideration of the above, the present invention offers quite a great contribution in forming magnetic thin films for high-density perpendicular magnetic recording media in the future.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A perpendicular magnetic recording medium comprising:
a nonmagnetic seed layer, a nonmagnetic underlayer, and a magnetic layer formed in this order on a nonmagnetic substrate,
wherein the nonmagnetic seed layer includes a MgO layer in direct contact with a metal layer thereon having a body-centered cubic (bcc) structure,
the nonmagnetic underlayer has a NaCl type structure of one selected from the group consisting of MgO, NiO, TiO, CrN, Ti carbides, and Ti nitrides, the nonmagnetic underlayer being disposed directly on the nonmagnetic seed layer, and
the magnetic layer includes an alloy selected from the group consisting of FePt, FePd, and CoPt having an $L1_0$ type ordered structure.

2. The perpendicular magnetic recording medium according to claim 1, wherein all of a (001) crystal lattice plane of the metal layer, a (001) crystal lattice plane of the NaCl type structure in the nonmagnetic underlayer, and a (001) crystal lattice plane of the $L1_0$ type ordered structure in the magnetic layer are parallel to a film surface.

3. The perpendicular magnetic recording medium according to claim 1, wherein a surface energy difference between a (002) plane and a (110) plane of the metal layer is 300 erg/cm$^2$ or smaller.

4. The perpendicular magnetic recording medium according to claim 1, wherein the metal layer has a thickness of 1 nm to 50 nm both inclusive.

5. The perpendicular magnetic recording medium according to claim 1, wherein the MgO layer disposed under the metal layer has a thickness equal to or larger than 0.2 nm and less than or equal to 3 nm.

6. A method for manufacturing a perpendicular magnetic recording medium, comprising:
a step of forming at least a nonmagnetic seed layer, a nonmagnetic underlayer, and a magnetic layer in this order on a nonmagnetic substrate,
wherein the nonmagnetic seed layer includes a MgO layer in direct contact with a metal layer thereon having a body-centered cubic (bcc) structure,
the nonmagnetic underlayer has a NaCl type structure of one selected from the group consisting of MgO, NiO, TiO, CrN, Ti carbides, and Ti nitrides, the nonmagnetic underlayer being disposed directly on the nonmagnetic seed layer,
the magnetic layer includes an alloy selected from the group consisting of FePt, FePd, and CoPt having an $L1_0$ type ordered structure, and
in the formation of the magnetic layer, the nonmagnetic substrate has a substrate temperature of 200° C. to 350° C., and a process gas has an impurity concentration of less than or equal to 5 ppb.

* * * * *